(12) United States Patent
Cha et al.

(10) Patent No.: US 8,165,207 B2
(45) Date of Patent: Apr. 24, 2012

(54) METHOD OF EFFECTIVELY PREDICTING MULTI-LAYER BASED VIDEO FRAME, AND VIDEO CODING METHOD AND APPARATUS USING THE SAME

(75) Inventors: Sang-chang Cha, Hwaseong-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/020,567

(22) Filed: Feb. 3, 2011

(65) Prior Publication Data

US 2011/0164680 A1 Jul. 7, 2011

Related U.S. Application Data

(63) Continuation of application No. 11/311,384, filed on Dec. 20, 2005, now Pat. No. 7,903,735.

(60) Provisional application No. 60/646,534, filed on Jan. 25, 2005.

(30) Foreign Application Priority Data

Feb. 26, 2005 (KR) .................... 10-2005-0016270

(51) Int. Cl.
*H04N 7/12* (2006.01)
(52) U.S. Cl. ......... 375/240.12; 375/240.11; 375/240.15; 375/240.16; 375/240.19; 375/240.24; 375/240.08; 382/240; 382/249; 382/226; 382/302
(58) Field of Classification Search .................... None
See application file for complete search history.

(56) References Cited

U.S. PATENT DOCUMENTS 6,614,936 B1 * 9/2003 Wu et al. .................... 382/238
(Continued)

FOREIGN PATENT DOCUMENTS

EP 1 429 564 A1 6/2004
(Continued)

OTHER PUBLICATIONS

Ascenso, Joao; Pereira, Fernando; Drift Reduction for a H.264/AVC Fine Grain Scalability with Motion Compensation Architecture; 2004; International Conference on Image Processing; pp. 2259-2262.

(Continued)

*Primary Examiner* — James A Thompson
*Assistant Examiner* — Miya J Cato
(74) *Attorney, Agent, or Firm* — Sughrue Mion, PLLC

(57) ABSTRACT

A method and apparatus are provided for effectively predicting a video frame that use all of the advantages of an intra mode and an intra BL mode in multi-layer structure based-video coding. The method includes reconstructing the intra block of a lower layer using the previously reconstructed first neighboring blocks of the intra block; subtracting the first neighboring blocks from previously stored the second neighboring blocks of an upper layer corresponding to the first neighboring blocks; creating a differential predicted block based on a predetermined intra prediction mode by performing intra prediction using virtual differential neighboring blocks that are created as a result of the subtraction; adding the differential predicted block and the reconstructed intra block; and subtracting a predicted block, which is created as a result of the addition, from a block of the upper layer corresponding to the intra block.

31 Claims, 11 Drawing Sheets

U.S. PATENT DOCUMENTS

| | | | |
|---|---|---|---|
| 7,903,735 B2 * | 3/2011 | Cha et al. | 375/240.12 |
| 2002/0150158 A1 * | 10/2002 | Wu et al. | 375/240.12 |
| 2003/0012279 A1 | 1/2003 | Chaddha | |
| 2003/0206594 A1 | 11/2003 | Zhou | |
| 2004/0042549 A1 | 3/2004 | Huang et al. | |
| 2005/0157784 A1 | 7/2005 | Tanizawa et al. | |
| 2005/0163211 A1 | 7/2005 | Shanableh | |
| 2005/0169374 A1 | 8/2005 | Marpe et al. | |
| 2005/0195896 A1 | 9/2005 | Huang et al. | |
| 2006/0222067 A1 * | 10/2006 | Park et al. | 375/240.08 |

FOREIGN PATENT DOCUMENTS

| | | |
|---|---|---|
| JP | 07-222165 | 8/1995 |
| JP | 08-237599 | 9/1996 |
| JP | 11-275585 | 10/1999 |
| KR | 2001-0080644 A | 8/2001 |
| KR | 10-2004-0054747 A | 6/2004 |

OTHER PUBLICATIONS

Yuwen He, Xuejun Zhao, Yuzhuo Zhong, Shiqiang Yang; Improved Fine Granular Scalable Coding with Inter-Layer Prediction; 2002; Data Compression Conference; pp. 1-10.

Communication issued in corresponding European Patent Application No. 05844804.4 on May 13, 2011.

JVT-N025 draft 0, Description of Core Experiments in SVC, Jan. 2005, http://wftp3.itu.int/av-arch/jvt-site/2005_01_HongKong/JVT-N025d0.zip, retrieved May 9, 2011.

* cited by examiner

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

METHOD OF EFFECTIVELY PREDICTING MULTI-LAYER BASED VIDEO FRAME, AND VIDEO CODING METHOD AND APPARATUS USING THE SAME

CROSS-REFERENCE TO RELATED APPLICATIONS

This application is a continuation of application Ser. No. 11/311,384, filed Dec. 20, 2005, which claims priority from Korean Patent Application No. 10-2005-0016270 filed on Feb. 26, 2005 in the Korean Intellectual Property Office, and U.S. Provisional Patent Application No. 60/646,534 filed on Jan. 25, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate generally to video coding, and more particularly, to effectively predicting a video frame that use all of the advantages of an intra mode and an intra BL mode in multi-layer structure based-video coding.

2. Description of the Related Art

As information and communication technology, including the Internet, develops, image-based communication as well as text-based communication and voice-based communication is increasing. The existing text-based communication is insufficient to satisfy various consumers demands. Therefore, the provision of multimedia service capable of accommodating various types of information, such as text, images and music, is increasing. Since the amount of multimedia data is large, multimedia data require high-capacity storage media and require broad bandwidth at the time of transmission. Therefore, to transmit multimedia data, including text, images and audio, it is essential to use a compression coding technique.

The fundamental principle of data compression is to eliminate redundancy in data. Data can be compressed by eliminating spatial redundancy such as the case where an identical color or object is repeated in an image, temporal redundancy such as the case where there is little change between neighboring frames or identical audio sound is repeated, or psychovisual redundancy in which the fact that humans' visual and perceptual abilities are insensitive to high frequencies is taken into account.

For such a moving image compression method, H.264/Advanced Video Coding (AVC), which has higher compression efficiency than Moving Picture Experts Group (MPEG)-4, has attracted attention recently. H.264 uses directional intra-prediction, which eliminates spatial similarity in each frame, as one of the schemes for improving compression efficiency.

Directional intra-prediction is a method of predicting the values of a current sub-block and encoding only a difference in such a way as to perform copying in predetermined directions using neighboring pixels on the upper and left sides of a sub-pixel with respect to the sub-block.

In H.264, a predicted block with respect to a current block is generated based on other blocks having preceding sequential positions. The difference between the current block and the predicted block is encoded. For a luminance component, each predicted block is generated on a 4×4 block or 6×16 macroblock basis. There are a total of nine optional prediction modes for each 4×4 block, whereas there are a total of four optional prediction modes for each 16×16 block. An H.264-based video encoder selects the one prediction mode that minimizes the difference between the current block and the predicted block, from among the prediction modes, for each block.

For prediction modes for the 4×4 block, H.264, as shown in FIG. 1, employs a total of nine prediction modes, including a total of nine directional modes (modes 0, 1, 3 to 8), and a DC mode (mode 2) that uses an average of the values of nine neighboring pixels.

FIG. 2 illustrates an example of labeling to illustrate the nine prediction modes. In this example, a predicted block (including regions "a" to "p") with respect to a current block is generated using previously decoded samples A to M. If regions E, F, G and H cannot be previously decoded, regions E, F, G and H can be virtually created by copying region D to the locations of the regions E, F, G and H.

With reference to FIG. 3, the nine prediction modes are respectively described in detail below. In the case of mode 0, the pixels of a predicted block are extrapolated using upper samples A, B, C and D in a vertical direction, and in the case of mode 1, the pixels are extrapolated using left samples I, J, K and L in a horizontal direction. Furthermore, in the case of mode 2, the pixels of the predicted block are uniformly replaced by the averages of upper samples A, B, C and D and left samples I, J, K and L.

In the case of mode 3, the pixels of the predicted block are interpolated between a lower-left position and an upper-right position in a direction that is inclined at an angle of 45°, and in the case of mode 4, the pixels are extrapolated in a direction that is inclined toward an upper-left position at an angle of 45°. Furthermore, in the case of mode 5, the pixels of the predicted block are extrapolated in a direction that is inclined rightward from a vertical direction at an angle of about 26.6° (width/height=½).

In the case of mode 6, the pixels of the predicted block are extrapolated in a direction that is inclined downward from a horizontal direction at an angle of about 26.6°, and in the case of mode 7, the pixels are extrapolated in a direction that is inclined leftward from a vertical direction at an angle of about 26.6°. Finally, in the case of mode 8, the pixels of the predicted block are interpolated in a direction that is inclined upward from a horizontal direction at an angle of about 26.6°.

The arrows of FIG. 3 indicate prediction directions in respective modes. In modes 3 to 8, the samples of the predicted block can be generated from the weighted averages of previously decoded reference samples A to M. For example, in the case of mode 4, sample d, which is located in the upper left, can be predicted as expressed by the following Equation 1. In this Equation, the round(.) function is a function that rounds off an input value to an integer position.

$$d = \text{round}(B/4 + C/2 + D/4) \qquad (1)$$

Meanwhile, a 16×16 prediction model for luminance components includes four modes, that is, mode 0, mode 1, mode 2 and mode 3. In the case of mode 0, the pixels of a predicted block are extrapolated from upper samples H, and in the case of mode 1, the pixels of a predicted block are extrapolated from left samples V. Furthermore, in the case of mode 2, the pixels of a predicted block are calculated using the averages of upper samples H and left samples V. Finally, in the case of mode 3, a "plane" function suitable for upper samples H and left samples V is used. This mode is more suitable for a region in which luminance smoothly changes.

Meanwhile, in addition to efforts to improve the efficiency of video coding, research into video coding that allows the resolution of transmitted video data, a frame rate, and a Signal-to-Noise Ratio (SNR) to be adjusted, that is, that supports scalability, is actively being carried out.

With regard to this scalable video coding technique, standardization work is in progress in the Moving Picture Experts Group (MPEG)-21 PART-13. Of these methods for supporting scalability, a multi-layered video coding method is considered a prominent method. For example, multiple layers, including a base layer, a first enhanced layer and a second enhanced layer 2, are provided and respective layers have different resolutions QCIF, CIF and 2CIF or different frame rates.

In the scalable video coding standard currently in progress, besides inter prediction and directional intra prediction (hereinafter simply referred to as intra prediction) used in existing H.264 to predict a current block or macroblock, a method of predicting a layer to which a current block belongs using the correlation between the current block and a corresponding lower layer block is additionally introduced. This prediction method is referred to as "intra BL (intra_BL) prediction" in the standard, and the case of performing encoding using such prediction is referred to as "intra BL mode."

FIG. 4 is a schematic diagram showing the three prediction methods, which illustrates the case of performing intra prediction on a macroblock of a current frame 1 (①), the case of performing inter prediction using a frame 2 placed at a temporal location different from that of the current frame 1 (②), and the case of performing intra BL prediction using texture data about the region 6 of the frame of a base layer corresponding to a macroblock (③).

As described above, in the scalable video coding standard, the advantageous one of the three prediction methods is selected for each macroblock, and a corresponding macroblock is encoded using the selected method. That is, for one macroblock, inter prediction, intra prediction and intra BL prediction are selectively used. However, a differential block created using intra BL prediction still has considerable correlation with neighboring differences. Accordingly, it is necessary to develop a prediction technique that takes the advantages of both intra BL prediction and intra prediction into account. Although a prediction method that takes the advantages of intra prediction, intra BL prediction and inter prediction into account may be considered, the characteristics of intra BL prediction and intra prediction are considerably different from those of inter prediction, so this method is not desirable.

SUMMARY OF THE INVENTION

The present invention provides a prediction method that uses both intra BL prediction and intra prediction.

Furthermore, the present invention may improve video coding efficiency using the prediction method.

According to an aspect of the present invention, there is provided a method of efficiently predicting a multi-layer based video frame, including reconstructing the intra block of a lower layer using the previously reconstructed first neighboring blocks of the intra block; subtracting the first neighboring blocks from previously stored the second neighboring blocks of an upper layer corresponding to the first neighboring blocks; creating a differential predicted block based on a predetermined intra prediction mode by performing intra prediction using virtual differential neighboring blocks that are created as a result of the subtraction; adding the differential predicted block and the reconstructed intra block; and subtracting a predicted block, which is created as a result of the addition, from a block of the upper layer corresponding to the intra block.

According to an aspect of the present invention, there is provided a method of efficiently predicting a multi-layer based video frame, including reconstructing the intra block of a lower layer using previously reconstructed the first neighboring blocks of the intra block; subtracting the first neighboring blocks from the previously stored second neighboring blocks of an upper layer corresponding to the first neighboring blocks; creating a differential predicted block based on a predetermined intra prediction mode by performing intra prediction using virtual differential neighboring blocks that are created as a result of the subtraction; adding the differential predicted block and the reconstructed intra block; subtracting a predicted block, which is created as a result of the addition, from a block of the upper layer corresponding to the intra block; and encoding a residual block that is created as a result of the subtraction.

According to an aspect of the present invention, there is provided a method of efficiently predicting a multi-layer based video frame, including reconstructing the intra block of a lower layer using the previously reconstructed first neighboring blocks of the intra block; subtracting the first neighboring blocks from the previously stored second neighboring blocks of an upper layer corresponding to the first neighboring blocks; creating a differential predicted block based on a predetermined intra prediction mode by performing intra prediction using virtual differential neighboring blocks that are created as a result of the subtraction; adding the differential predicted block and the reconstructed intra block; reconstructing a block of the upper layer corresponding to the intra block; and adding the reconstructed block of the upper layer and a predicted block that is acquired as a result of the addition.

According to an aspect of the present invention, there is provided a multi-layer based video encoder, including a means for reconstructing the intra block of a lower layer using the previously reconstructed first neighboring blocks of the intra block; a means for subtracting the first neighboring blocks from the previously stored second neighboring blocks of an upper layer corresponding to the first neighboring blocks; a means for creating a differential predicted block based on a predetermined intra prediction mode by performing intra prediction using virtual differential neighboring blocks that are created as a result of the subtraction; a means for adding the differential predicted block and the reconstructed intra block; a means for subtracting a predicted block, which is created as a result of the addition, from a block of the upper layer corresponding to the intra block; and a means for encoding a residual block that is created as a result of the subtraction.

According to an aspect of the present invention, there is provided a multi-layer based video encoder, including a means for reconstructing the intra block of a lower layer using the previously reconstructed first neighboring blocks of the intra block; a means for subtracting the first neighboring blocks from the previously stored second neighboring blocks of an upper layer corresponding to the first neighboring blocks; a means for creating a differential predicted block based on a predetermined intra prediction mode by performing intra prediction using virtual differential neighboring blocks that are created as a result of the subtraction; a means for adding the differential predicted block and the reconstructed intra block; a means for reconstructing a block of the upper layer corresponding to the intra block; and a means for adding the reconstructed block of the upper layer and a predicted block that is acquired as a result of the addition.

BRIEF DESCRIPTION OF THE DRAWINGS

The above and other aspects of the present invention will be more clearly understood from the following detailed description of the exemplary embodiments taken in conjunction with the accompanying drawings, in which.

DESCRIPTION OF THE EXEMPLARY EMBODIMENTS

Figures 1, 2:
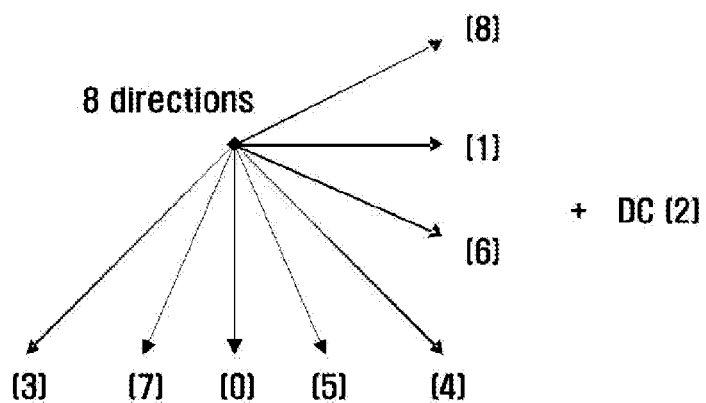
FIG. 1 is a diagram illustrating prediction directions for respective modes defined by H.264.
FIG. 2 is a diagram illustrating an example of labeling that is used to illustrate the intra prediction modes of FIG. 1.

Reference now should be made to the drawings, in which the same reference numerals are used throughout the different drawings to designate the same or similar components.

Figure 5:
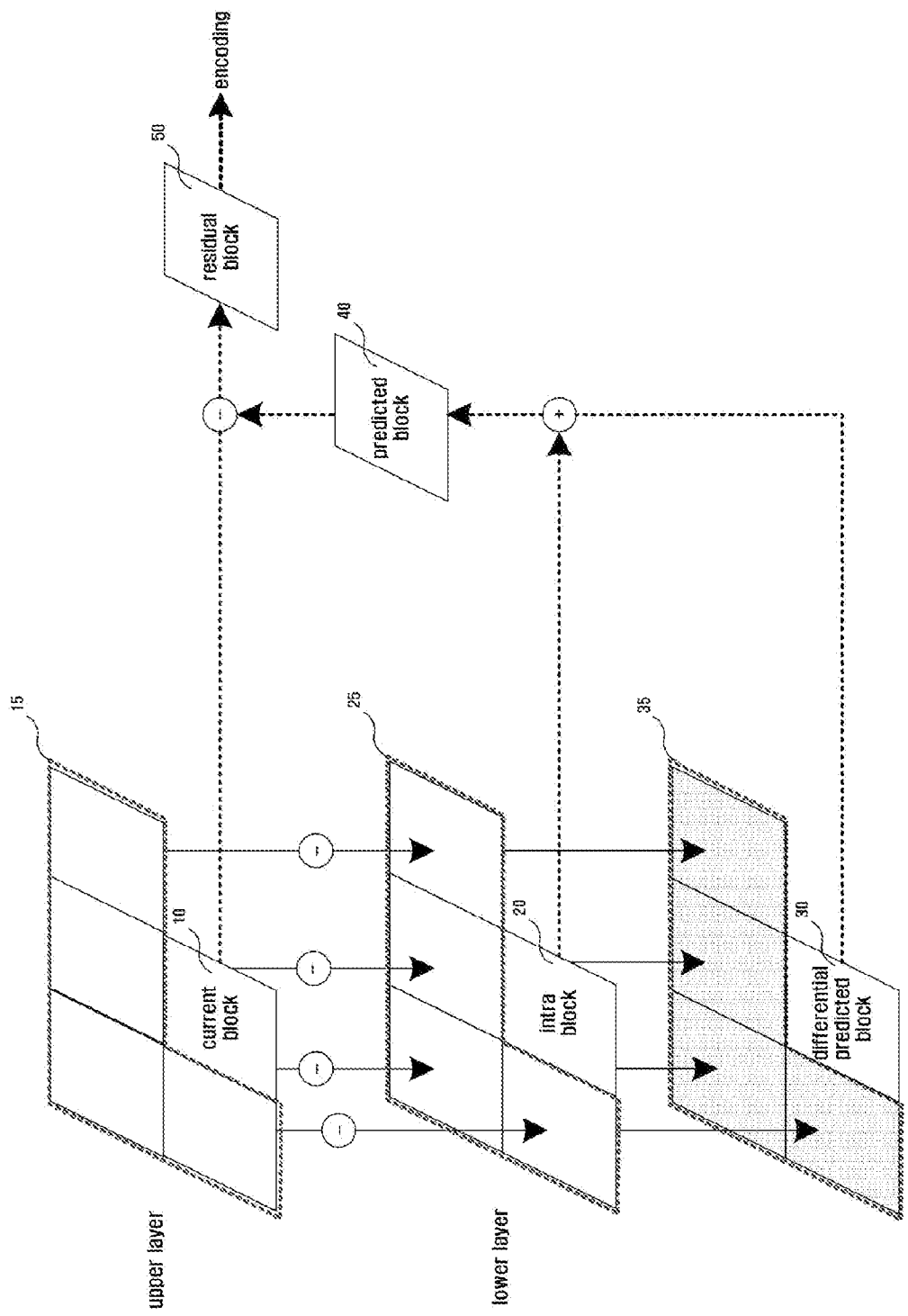
FIG. 5 is a diagram illustrating the concept of a prediction method according to an exemplary embodiment of the present invention.

FIG. 5 is a diagram illustrating the concept of a prediction method according to an exemplary embodiment of the present invention. In the method, how to create a predicted block 40 for the original image of a current block 10 (hereinafter simply referred to as a current block) that belongs to an upper layer is an essential point. In the present invention, the term "block" may be defined as a block having a size identical to that of an intra block of the H.264 standard. Meanwhile, for a conventional intra block, 4×4 mode and 16×16 mode exist for luminance components and 8×8 mode exists for chrominance components and, accordingly, the "block" of the present invention may have one of the various sizes.

In an upper layer, before the prediction of a current block 10, the neighboring blocks of the current block 10 have already been encoded/decoded using a certain prediction method. The neighboring blocks 15 may be encoded/decoded using any prediction method, such as inter-prediction, intra-prediction, or intra BL prediction.

In order to predict the current block 10 as described above, images passed through encoding and decoding (closed loop), rather than the original images of the neighboring blocks 15, are used. Currently, most codecs eliminate drifting error, which is produced between a video encoder and a video decoder, using such closed loop encoding, so that reconstructed images, which are decoded after being encoded, are used as the images of existing blocks that are used to predict a current block in the present invention. However, it is apparent to those skilled in the art that the present invention can also be applied to an open loop method using the original images of existing blocks.

Figure 3:
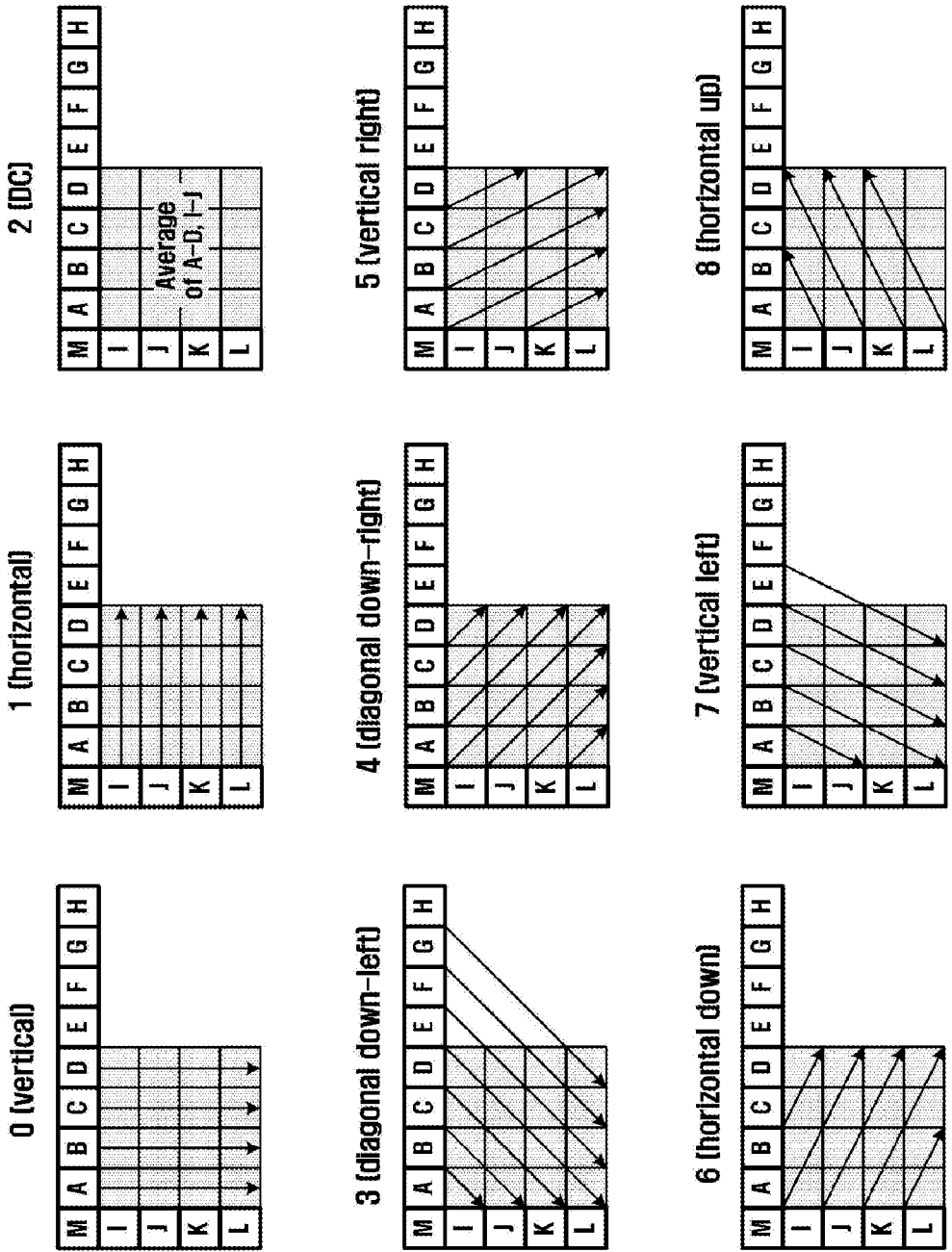
FIG. 3 is a diagram illustrating the intra prediction modes of FIG. 1 in detail.
Figure 4:
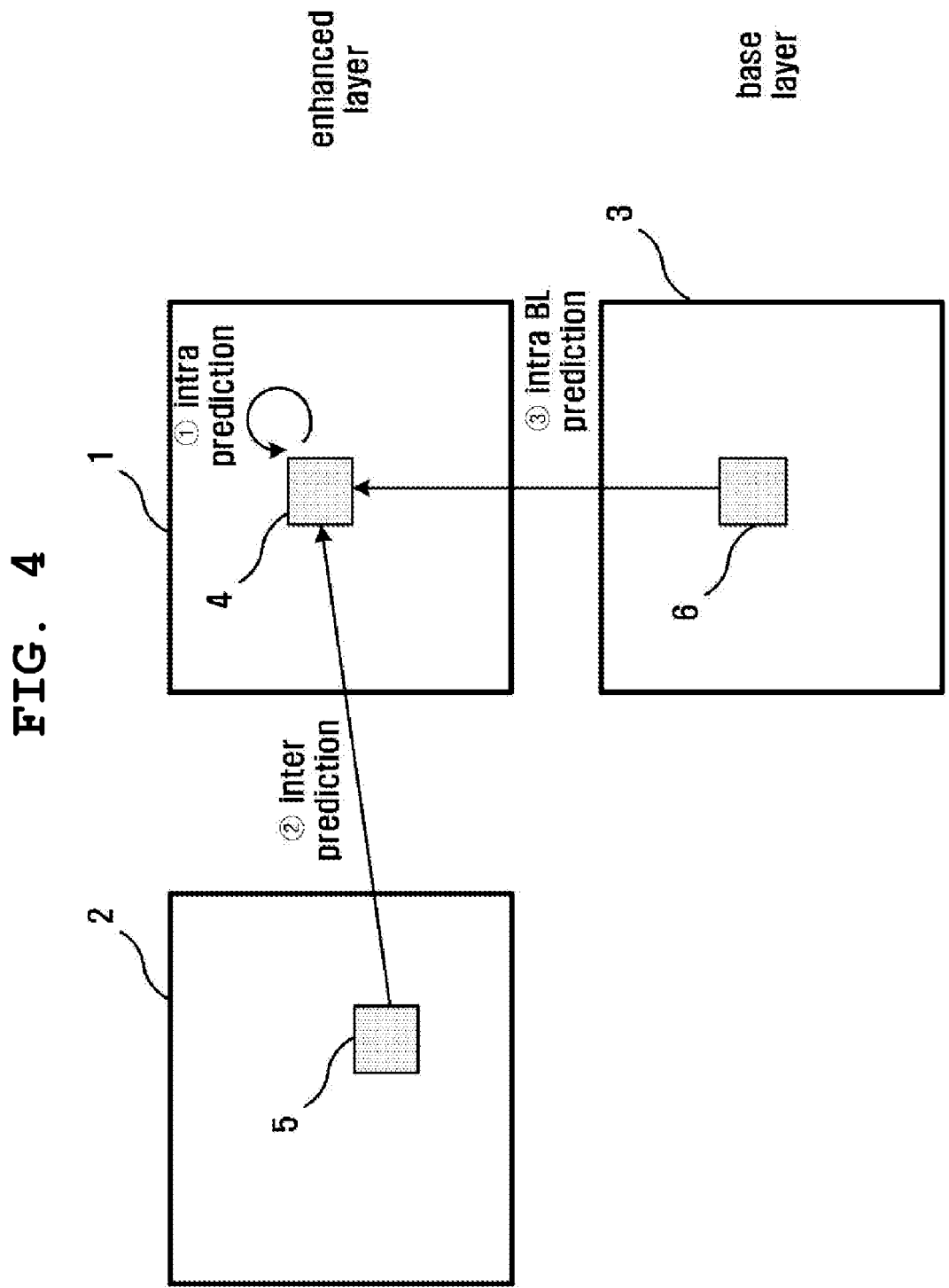
FIG. 4 is a schematic diagram illustrating conventional three prediction methods.

In a lower layer, a block corresponding to the current block 10 (hereinafter referred to as a "corresponding block") refers to an intra block 20 that has been encoded and decoded using intra prediction as shown in FIG. 3. Furthermore, the neighboring blocks 25 of the intra block 20 can be encoded/decoded using any prediction method in the same manner as the neighboring blocks 15 of the upper layer. The neighboring blocks 25 of the lower layer exist at locations corresponding to those of the neighboring blocks 15.

Meanwhile, the resolution of the upper layer may be identical to or different from the resolution of the lower layer. If the resolutions of both layers are identical to each other, the size of the blocks 10 and 15 of the upper layer is identical to the size of the blocks 20 and 25 of the lower layer. Otherwise, the blocks 10 and 15 of the upper layer may be larger than those of the lower layer. For example, if the resolution of the upper layer is two times the resolution of the lower layer and the blocks 20 and 25 of the lower layer have a 4×4 size, the blocks of the upper layer may have an 8×8 size.

Furthermore, although the present invention is described with the term "neighboring block" referring to four blocks, that is, left, upper left, upper and upper right blocks, which are referred to for intra prediction, the number and locations of neighboring blocks may vary if the type of blocks, which are referred to for intra prediction, varies.

As described above, when the neighboring blocks 15 of the upper layer and the intra block 20 and neighboring blocks 25 of the lower layer have been all reconstructed, the predicted block 40 of the current block 10 can be created using them. A process of creating the predicted block 40 is described in detail below.

First, virtual differential neighboring blocks 35 are created by subtracting the reconstructed neighboring blocks 25 of the lower layer from the neighboring blocks 15 of the upper layer. The subtraction is performed between the corresponding blocks of both layers. When directional intra prediction illustrated in FIG. 3 is applied to the neighboring blocks 35 created as described above, differential predicted blocks 30 can be created for nine modes.

Thereafter, each of the nine created differential predicted blocks 30 is added to the intra block 20, and then an optimal candidate is selected from nine candidates obtained for the predicted block 40. For example, the selection may be performed in such a way as to select one that minimizes the image different between each of the nine candidates and the current block 10. Alternatively, for another example, a method of predicting the current block 10 using the nine candidates for the predicted block 40, encoding prediction results and selecting an optimal candidate using the Rate-Distortion (R-D) cost function may be used. The former method has the advantages of a small amount of calculation and simple performance, while the latter method has the advantage of more accurate selection between candidates.

When the predicted block 40 is selected from the candidates for the predicted block 40, the current block 10 is predicted using the predicted block 40. That is, a residual block 50 is created by subtracting the predicted block 40 from the created current block 10. Thereafter, the fundamental operation of the present invention is completed by encoding the residual block 50.

The schematic operation of the present invention is described above. The conventional method using an intra BL mode is schematically compared to the method of the present invention from a conceptual point of view. When the image of the current block 10 is C1 and the reconstructed intra block 20 of the lower layer is C0, C0 is used as the predicted block of C1 in the conventional intra BL mode on the assumption that C0 is similar to C1, as shown in Equation 2.

$$C1-C1 \approx 0 \qquad (2)$$

In contrast, the present invention does not use C0 as the predicted block, but instead uses the correlation of the following Equation 3. In Equation 3, INT(.) refers to a function that performs directional intra prediction, N1 refers to the neighboring blocks of the upper layer and $N_0$ refers to the neighboring blocks of the lower layer.

$$C_1 - C_0 \approx INT(N_1 - N_0) \neq 0 \qquad (3)$$

As shown in Equation 3, the difference between the current block $C_0$ and the corresponding lower layer block $C_1$ has considerable correlation with the results of intra prediction that is performed using the neighboring blocks $N_1$ of the upper layer and the neighboring blocks $N_0$ of the lower layer. Accordingly, the current block $C_1$ based on the present invention can be more accurately predicted using the following Equation 4.

$$C_1 \approx C_0 + INT(N_1 - N_0) \qquad (4)$$

where $C_1$, $C_0$, and $INT(N_1 - N_0)$ designate the current block 10, reconstructed intra block 20 and differential predicted block 30 of FIG. 5, respectively.

Figure 6:
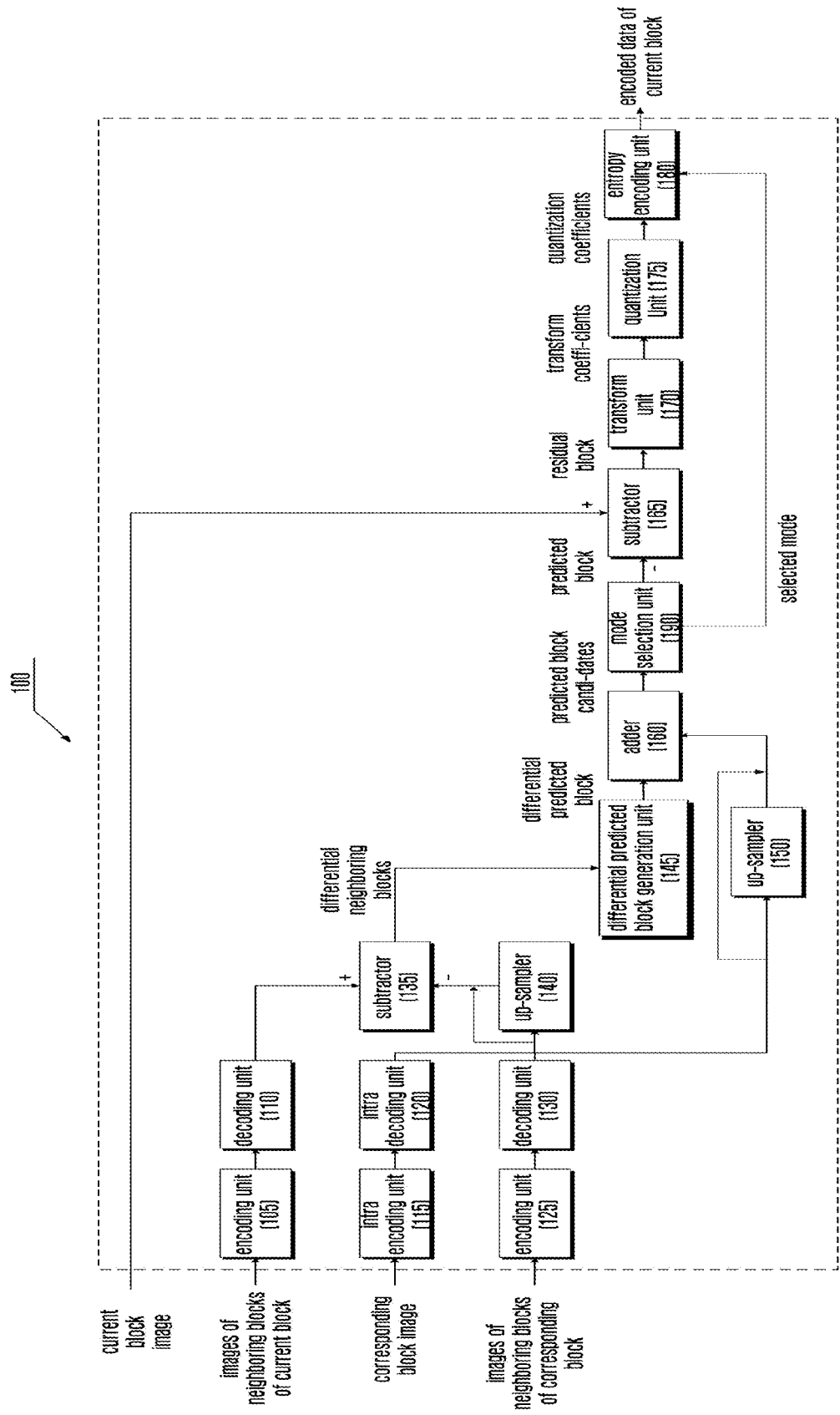
FIG. 6 is a block diagram illustrating the construction of a video encoder according to an exemplary embodiment of the present invention.

FIG. 6 is a block diagram showing the construction of a video encoder 100 according to an exemplary embodiment of the present invention. The video encoder 100 is constructed to use current and neighboring block images and the images of the corresponding block and its neighboring blocks of the lower layer as input and to output data in which the current block is encoded.

An encoding unit 105 encodes the images of the neighboring blocks of a current block, and a decoding unit 110 decodes encoded results. The encoding and decoding processes follow general video encoding/decoding processes. The encoding unit 105 may be represented by the schematic construction of FIG. 7. For the input neighboring block images, one method is selected from among inter prediction, intra prediction and intra BL prediction by a selection unit 61. In conformity with the selected prediction method, one of an inter prediction unit 62, an intra prediction unit 63 and an inter BL prediction unit 64 creates a residual block from the input images. A transform unit 65 creates a transform coefficient from the residual block using a transform algorithm, such as discrete cosine transform (DCT), or wavelet transform, and a quantization unit 66 quantizes the transform coefficient.

Figure 8:
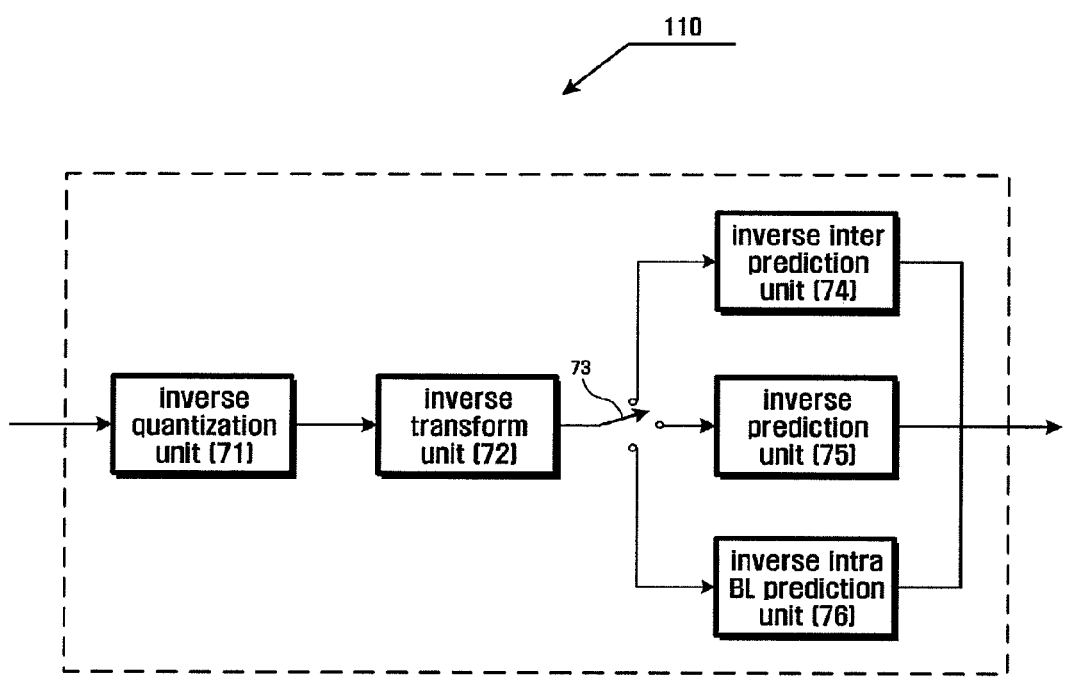
FIG. 8 is a block diagram illustrating the schematic construction of a decoding unit that is included in the video encoder of FIG. 6.

Furthermore, the decoding unit 110 may be represented by the schematic construction of FIG. 8. An inverse quantization unit 71 inversely quantizes signals output from the encoding unit 105, and an inverse transform unit 72 performs the transform process of the transform unit 65 on inversely quantized results in inverse order. Furthermore, a selection unit 73 selects an inverse prediction method corresponding to the prediction method selected by the encoding unit 105. In conformity with the selection, an inverse inter prediction unit 74, an inverse intra prediction unit 75, or an inverse intra BL prediction unit 76 reconstructs neighboring blocks by performing the inverse of the process of the encoding unit 105, that is, inverse prediction, on inversely transformed signals. The reconstructed neighboring blocks are input to a subtractor 135.

An intra encoding unit 115 encodes the corresponding block image, and the intra decoding unit 120 decodes encoded results. It should be noted that in the present invention, the corresponding block must be encoded using intra prediction. However, the neighboring blocks of the current block or the neighboring blocks of the corresponding block may be encoded using any prediction method.

Figure 7:
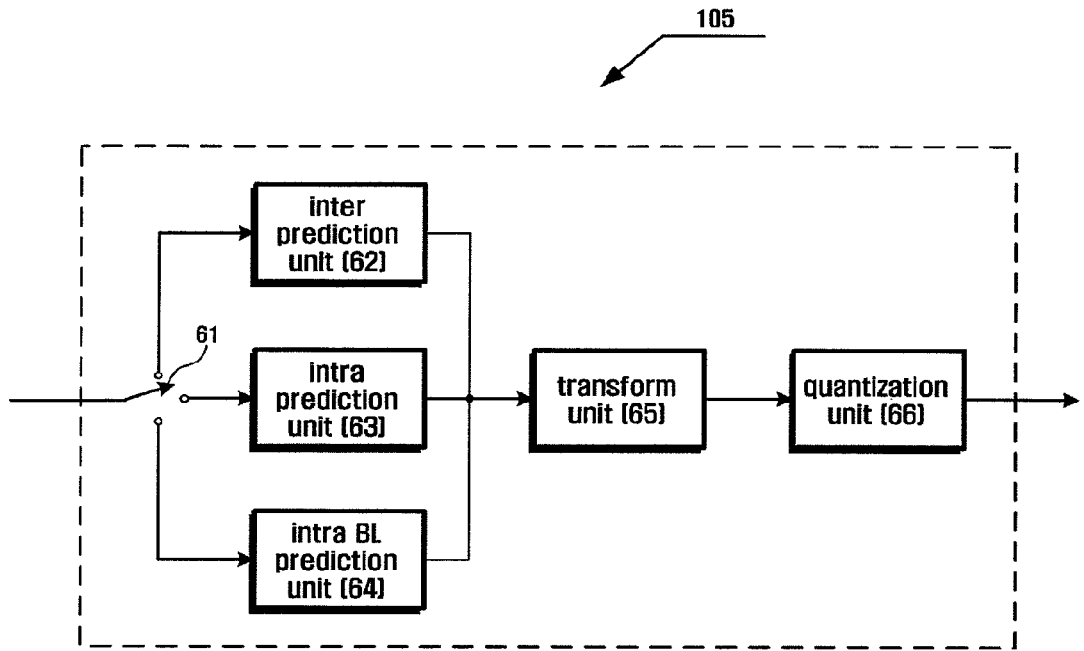
FIG. 7 is a block diagram illustrating the schematic construction of an encoding unit that is included in the video encoder of FIG. 6.

Accordingly, the intra encoding unit 115 may be formed of the intra prediction unit 63, the transform unit 65 and the quantization unit 66, as shown in the block diagram of FIG. 7, and the intra decoding unit 120 may be formed of the inverse quantization unit 71, the inverse transform unit 72 and the inverse intra prediction unit 75, as shown in the block diagram of FIG. 8.

A signal output from the intra decoding unit 120, that is, a reconstructed corresponding block (intra block), is input to an adder 160 selectively through an up-sampler 150. The up-sampler 150 is not used when the resolutions of the upper layer and the lower layer coincide with each other, and performs up-sampling so that the resolution of the reconstructed intra block coincides with that of the upper layer when the resolutions do not coincide with each other.

Meanwhile, the encoding unit 125 encodes the images of the neighboring blocks of the corresponding block, and the decoding unit 130 decodes the encoded results. The encoding unit 125 may have a construction identical to that of FIG. 7, and the decoding unit 130 may have a construction identical to that of FIG. 8.

A signal output from the decoding unit 130, that is, reconstructed neighboring blocks, is input to the subtractor 160 selectively through the up-sampler 140. The up-sampler 140 is not used when the resolutions of the upper layer and the lower layer coincide with each other, and performs up-sampling so that the resolution of the reconstructed neighboring blocks coincides with that of the upper layer when the resolutions do not coincide with each other.

The subtractor 135 acquires differential neighboring blocks by subtracting a signal, which is input from the decoding unit 130 or up-sampler 140, from a signal, which is input from the decoding unit 110.

A predicted block creation unit 145 creates a predetermined number of differential predicted blocks for respective modes by performing directional intra prediction using the differential neighboring blocks. For example, as shown in FIG. 3, in H.264, a total of nine modes, including eight modes having directionality and one DC mode, can be used. Nine differential predicted blocks are created for the respective modes, and the created differential predicted blocks are provided to the adder 160.

The adder 160 adds the differential predicted blocks for the respective modes to the signal input from the intra decoding unit 120 or from the up-sampler 150. As a result, a number of the predicted block candidates equal to the number of modes are created.

The mode selection unit 190 selects an optimal mode (intra prediction mode) from the modes that the predicted block candidates have, and selects an optimal predicted block from the predicted block candidates based on the selected mode. The mode selection is performed in such a way as to select the mode that minimizes the difference between the predicted block candidates and the current block, as described above. In this case, the difference between the blocks refers to the sum of the differences between corresponding pixel values of the blocks.

Thereafter, the subtractor 165 creates a residual block by subtracting the selected predicted block from the image of the input current block.

The transform unit 170 creates a transform coefficient performing spatial transform on the residual block. As a spatial transform method, DCT, wavelet transform, etc. may be used. If DCT is used as the spatial transform, the transform coefficient refers to a DCT coefficient. When wavelet transform is used as the spatial transform, the transform coefficient refers to a wavelet coefficient.

The quantization unit 175 quantizes the transform coefficient. The term quantization refers to a process of dividing the transform coefficient, which is represented by arbitrary real values, at regular intervals, representing the transform coefficient with discrete values, and matching the discrete values to predetermined indices. In particular, when wavelet transform is used for the spatial transform, an embedded quantization method is widely used as the quantization method. The embedded quantization method includes the Embedded Zerotrees Wavelet Algorithm (EZW), Set Partitioning in Hierarchical Trees (SPIHT), Embedded ZeroBlock Coding (EZBC), or other methods known to those skilled in the art.

The entropy encoding unit 180 encodes the transform coefficient, which is quantized by the quantization unit 175, and information about the mode, which is selected by the mode selection unit 190, without loss. As a lossless encoding method, arithmetic coding, variable length coding, etc. may be used, with the result that the encoded data of the current block are output.

Figure 9:
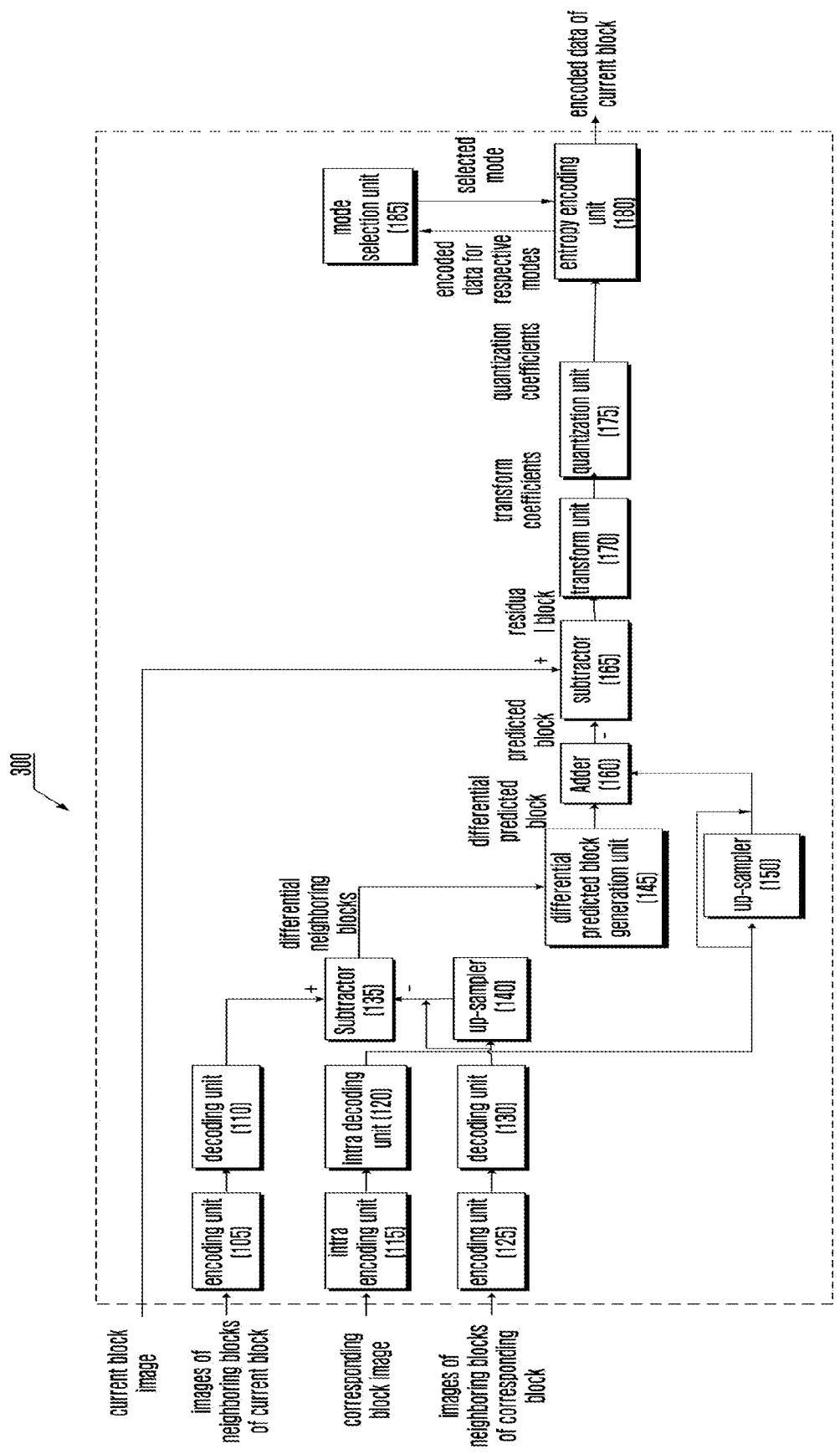
FIG. 9 is a block diagram illustrating the construction of a video encoder according to another exemplary embodiment of the present invention.

FIG. 9 is a block diagram illustrating the construction of a video encoder according to another exemplary embodiment of the present invention. The exemplary embodiment of FIG. 9 employs the scheme in which the mode selection unit 185 uses results losslessly encoded by the entropy encoding unit 180, unlike the exemplary embodiment of FIG. 6. Accordingly, the differential predicted block creation unit 145 creates differential predicted blocks for respective modes, for example, 9 intra prediction modes, and creates predicted blocks, residual blocks, transform coefficients and quantized coefficients for respective modes, and an optimal mode is finally selected through comparison in the mode selection unit 185.

The mode selection unit 185 applies the R-D cost function to the data encoded for respective modes by the entropy encoding unit 180, and selects the mode that minimizes the R-D cost function. The R-D cost function may be defined by the following Equation 5. In this Equation, E refers to the difference between a signal (reconstructed current data), in which the encoded data are reconstructed, and an original signal (current block), and B refers to the number of bits that is required to perform each method. Furthermore, $\lambda$ is a Lagrangian coefficient, and refers to the coefficient that can adjust the reflection ratios of E and B.

$$C = E + \lambda B \qquad (5)$$

The mode selected by the mode selection unit 185 is transferred to the entropy encoding unit 180, and the entropy encoding unit 180 encodes information about the selected mode without loss, and outputs encoded information along with the encoded data of the current block corresponding to the selected mode.

The exemplary method proposed in FIGS. 6 and 9 requires a large number of symbol bits compared to the existing intra BL prediction. The reason for this is that the existing intra BL prediction does not require additional mode information while the prediction method according to the present invention requires 9 pieces of additional mode information. The overhead based on the directional intra prediction modes can be eliminated using intra prediction mode on the base layer as it is.

Figure 10:
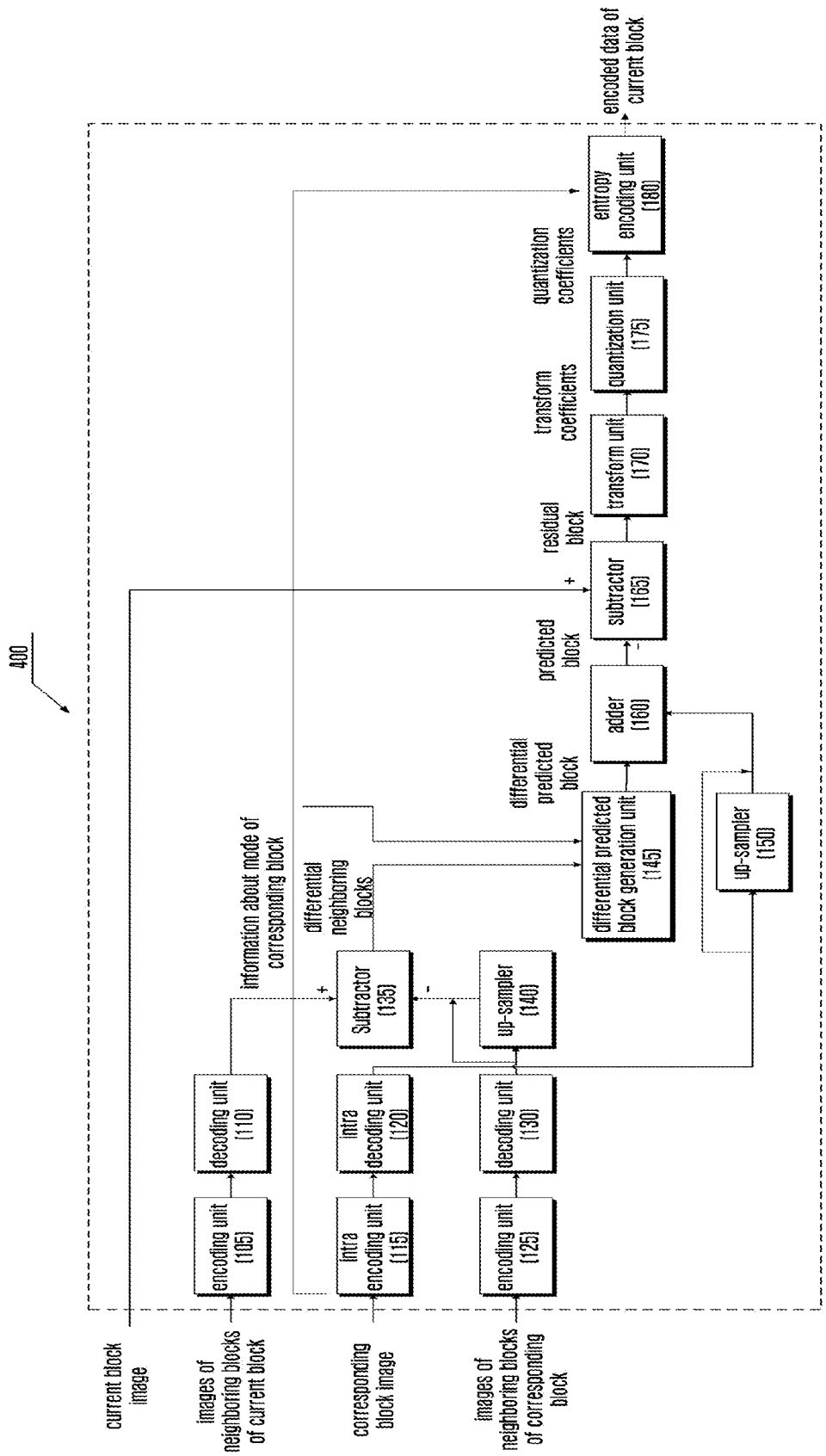
FIG. 10 is a block diagram illustrating the construction of a video encoder according to still another exemplary embodiment of the present invention.

FIG. 10 is a block diagram showing the construction of the video encoder 400 in the case of using the intra prediction mode, which is used at the time of intra prediction in the lower layer, so as to create the differential predicted block (30 of FIG. 5) from the differential neighboring blocks (35 of FIG. 5).

Most of the construction of FIG. 10 is similar to the construction of FIG. 6 or 9. The construction of FIG. 10 is different from the construction of FIG. 6 or 9 in that information about the mode, which is provided by the intra encoding unit 115, is input to the differential predicted block creation unit 145 and the entropy encoding unit 180. The differential predicted block creation unit 145 creates a single differential predicted block based on the information about the mode. The differential predicted block creation unit 145 creates a number of differential predicted blocks equal to the number of modes in the exemplary embodiments of FIGS. 6 and 9.

Meanwhile, the entropy encoding unit 180 does not need to encode information about the mode of the current block, but encodes only information about the mode of the corresponding block of the lower layer. Accordingly, the present invention does not increase overhead compared to existing intra BL prediction.

Although, in the exemplary embodiments of FIGS. 6, 9, and 10, the process of encoding the current block in accordance with the present invention has been described, those skilled in the art can easily appreciate that a video frame can be encoded by combining the encoded current block with the previously encoded neighboring blocks.

Meanwhile, when, like the exemplary embodiments of FIGS. 6 and 9, additional prediction modes are calculated, it is necessary to develop a method of somewhat reducing overhead caused by the additional prediction modes. Accordingly, in the present invention, a method of encoding only directional differences with respect to the prediction mode of the corresponding block, not the information about the mode of the current block, is used.

Figure 11:
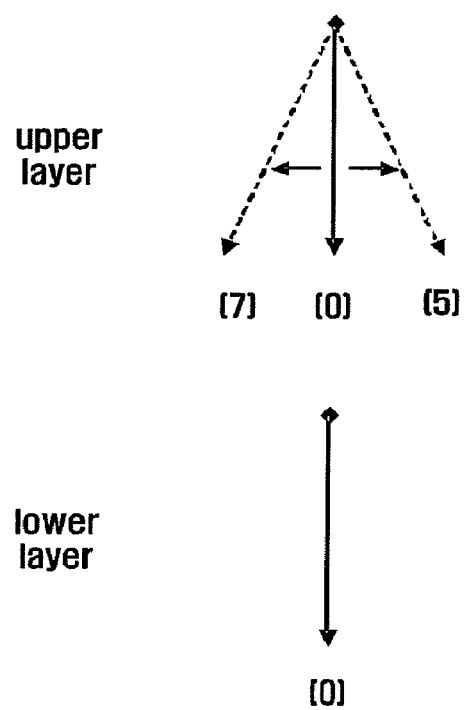
FIG. 11 is a view illustrating neighboring direction with respect to a vertical mode.

FIG. 11 is a diagram illustrating a method of performing searches only in directions neighboring a vertical direction in the current block when the optimal prediction direction of the corresponding block is a vertical mode (mode 0). That is, since the optimal prediction mode of the corresponding block represents the vertical direction, there is a strong possibility that the optimal prediction mode of the current block is a vertical mode (mode 0), a vertical left mode (mode 7), or a vertical right mode (mode 5). Accordingly, by searching only modes corresponding to the directions, the amount of calculation at the time of directional intra prediction can be reduced. Additionally, by representing a clockwise neighboring direction with −1, a counterclockwise neighboring direction with +1, and the same direction with 0 and encoding them, the number of bits required to encode optimal directions can be effectively reduced.

As described above, each mode can be represented with a difference regardless of a mode number, with only the direction thereof being taken into account. In the present invention, this difference is defined as a "directional difference." For example, on the basis of mode 0, the directional difference of mode 6 is +3, and the directional difference of mode 3 is −2.

Figure 12:
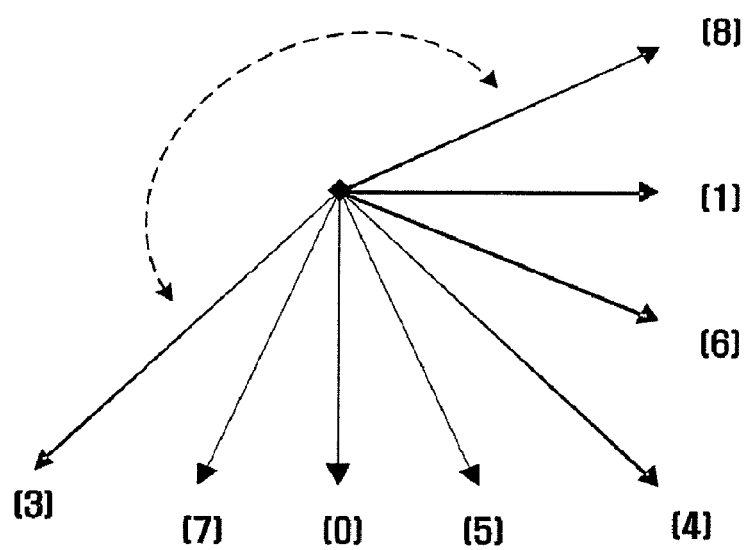
FIG. 12 is a view illustrating neighboring directions with respect to 8 intra prediction modes having directionality.

FIG. 12 is a diagram illustrating neighboring directions with respect to 8 intra prediction modes having directionality.

For example, the neighboring modes of mode 7 are mode 3 and mode 0, and the neighboring modes of mode 0 are mode 7 and mode 5. There is the problem of how to determine the neighboring modes of mode 3 and mode 8. In an exemplary embodiment of the present invention, neighboring modes may be defined as two modes that are most adjacent to a mode in clockwise and counterclockwise directions regardless of a distance thereto. Accordingly, the neighboring modes of mode 3 are mode 8 and mode 7, and the neighboring modes of mode 8 are mode 1 and mode 3. Based on the above description, the neighboring modes of a specific mode are represented with −1 or 1, and uniformity is assured for all the intra prediction modes having directionality.

However, modes 3 and 8 represent almost opposite directions, so that it is difficult to regard each of the modes 3 and 8 as falling within the other's prediction range. Therefore, in another exemplary embodiment of the present invention, modes 3 and 8 may each have a single neighboring mode. In this case, the neighboring mode of mode 3 is mode 7 and the neighboring mode of mode 8 is mode 1.

Figure 13:
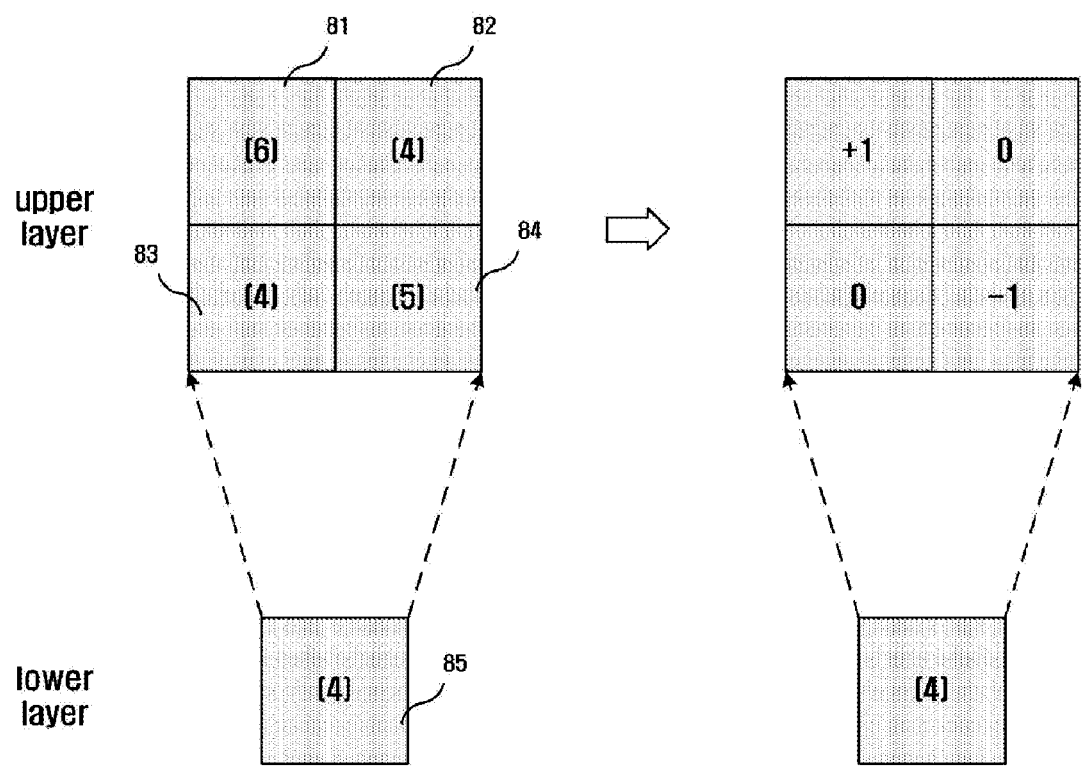
FIG. 13 is a diagram illustrating the corresponding regions between layers when the resolutions of the layers do not coincide with each other.

Meanwhile, when the resolution of the current layer is different from the resolution of the lower layer, the current block and the lower layer block do not correspond to each other on a one to one basis. Referring to the example of FIG. 13, if the resolution of the lower layer is ½ of that of the current layer, a single block of the lower layer corresponds to four blocks 81 to 84. Accordingly, in this case, it should be noted that the blocks of a lower layer corresponding to the four blocks 81 and 84 of the current block are all a block 85.

By representing the modes of the current block with directional differences and entropy-encoding the directional differences, overhead can be somewhat reduced.

Figure 14:
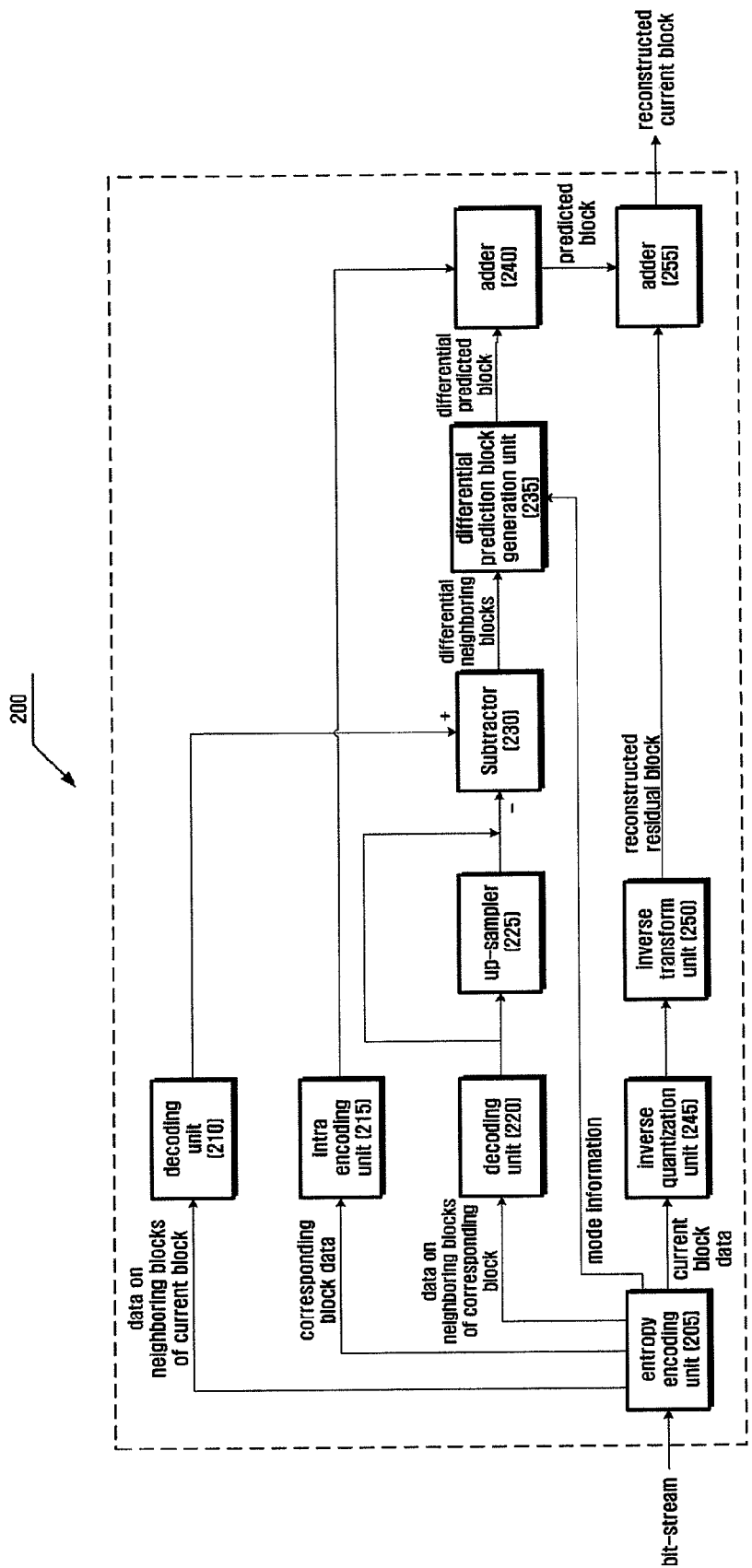
FIG. 14 is a block diagram illustrating the construction of a video decoder according to an exemplary embodiment of the present invention.

FIG. 14 is a block diagram illustrating the construction of the video decoder 200 according to an exemplary embodiment of the present invention.

An entropy decoding unit 205 decodes an input bit-stream without loss, and extracts data on the neighboring blocks of a current block, data on a corresponding block, data on the neighboring blocks of the corresponding block, data on the current block and information about the mode of the current block.

The decoding unit 210 decodes data on the neighboring blocks of the current block and provides decoding results to a subtractor 230. The decoding unit 210 may be constructed to be the same as the decoding unit 110 of FIG. 6. Meanwhile, the intra decoding unit 215 decodes data on the corresponding block and provided decoding results to an adder 240. The intra decoding unit 215 may be constructed to be the same as the intra decoding unit 120 of FIG. 6.

Furthermore, the decoding unit 220 decodes data on the neighboring blocks of the corresponding block and provides decoding results to the subtractor 230a selectively through an up-sampler 225. The decoding unit 220 may be constructed to be the same as the decoding unit 130 of FIG. 6. The up-sampler 225 is not used when the resolution of an upper layer coincides with the resolution of a lower layer, and performs up-sampling so that the resolution of the neighboring blocks, which are decoded by the decoding unit 220, coincides with that of the upper layer when the resolutions do not coincide with each other.

The subtractor 230 creates differential neighboring blocks by subtracting signals, which are directly input from the decoding unit 220 or input through the up-sampler 225, from signals that are input from the decoding unit 210.

The differential predicted block creation unit 235 performs intra prediction based on the mode information, which is transferred from the entropy decoding unit 205, using the differential neighboring blocks. As a result, a differential predicted block is created.

The adder 240 creates a predicted block by adding a signal that is output from the intra decoding unit 215, that is, the reconstructed corresponding block (intra block), and the differential predicted block.

Meanwhile, the data on the current block, which are output from the entropy decoding unit 205, are input to an inverse quantization unit 245, and an inverse quantization unit 245 inversely quantizes the data on the current block. This inverse quantization process is the inverse of the quantization process that is performed in the quantization unit 175 of the video encoder 100, 300 or 400, and is the process of finding a quantized coefficient that matches a value that is represented by a certain index.

The inverse transform unit 250 reconstructs a residual block by inversely transforming the inverse quantization results. The inverse transform is the inverse of the transform process that is performed in the transform unit 170 of the video encoder 100, 300, or 400. If the transform process is DCT, the inverse transform is inverse DCT; if the transform process is wavelet transform, the inverse transform is inverse wavelet transform.

Finally, an adder 255 reconstructs a current block by adding the created predicted block and the reconstructed residual block.

The elements of FIGS. 6, 9, 10 and 14 may be software, or hardware, such as Field-Programmable Gate Arrays (FPGAs) or Application-Specific Integrated Circuits (ASICs). However, the elements are not limited to software or hardware. The elements may be constructed to reside in an addressable recording medium, or to drive one or more processors. The function of each element may be implemented using subdivided elements, and the function may be implemented using a single element that is composed of a plurality of sub-elements and performs a specific function.

In accordance with the present invention, the advantages of intra BL prediction and the advantages of intra prediction are all taken into account, so that the efficiency of video coding can be improved.

In accordance with the present invention, mode information can be more efficiently displayed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of efficiently predicting a multi-layer based video frame, the method comprising:
   acquiring a current block that belongs to an upper layer;
   creating a prediction block with respect to the current block; and
   predicting the current block based on the created prediction block,
   wherein said creating a prediction block comprises creating a differential predicted block based on an intra prediction mode by performing intra prediction on a result of subtracting neighboring blocks of a lower layer from neighboring blocks of the upper layer.

2. The method as set forth in claim 1, wherein said creating a prediction block comprises adding the differential predicted block and an intra block of the lower layer.

3. The method as set forth in claim 1, wherein said predicting the current block comprises subtracting the created prediction block from the current block of the upper layer.

4. The method as set forth in claim 1, further comprising up-sampling the neighboring blocks of the lower layer before said creating a prediction block, if a resolution of the upper layer does not coincide with a resolution of the lower layer.

5. The method as set forth in claim 4, further comprising up-sampling an intra block of the lower layer before said creating a prediction block, if the resolution of the upper layer does not coincide with the resolution of the lower layer.

6. The method as set forth in claim 1, wherein the intra prediction mode comprises nine modes including eight directional modes and one DC mode.

7. The method as set forth in claim 1, wherein the intra prediction mode is selected from among nine modes including eight directional modes and one DC mode.

8. The method as set forth in claim 7, wherein the intra prediction mode is selected by adding nine differential prediction blocks based on the nine modes to the intra block, and selecting one, which has a minimum image difference with respect to the current block of the upper layer corresponding to the intra block, from among nine predicted block candidates that are acquired by the addition.

9. The method as set forth in claim 7, wherein the selection of the mode is performed by adding nine differential prediction blocks based on the nine modes to the intra block, applying a Rate-Distortion (R-D) cost function to nine encoded differential predicted block candidates that are acquired by encoding nine predicted block candidates acquired as a result of the adding the nine differential prediction blocks to the nine encoded differential predicted block candidates, and selecting one, which minimizes the R-D cost function, from among the nine differential predicted block candidates.

10. The method as set forth in claim 7, wherein the selected intra prediction mode is identical to an optimal intra prediction mode that is used for reconstructing the intra block of the lower layer.

11. The method as set forth in claim 2, wherein the intra block and the neighboring blocks of the lower layer each have a 4×4 size.

12. The method as set forth in claim 2, wherein the neighboring blocks of the lower layer comprise a left block, an upper left block, an upper block and an upper right block of the intra block, and the neighboring blocks of the upper layer comprise a left block, an upper left block, an upper block and an upper right block of the current block of the upper layer that corresponds to the intra block.

13. A method of efficiently predicting a multi-layer based video frame, the method comprising:
acquiring a current block that belongs to an upper layer;
creating a prediction block with respect to the current block; and
predicting the current block based on the created prediction block,
wherein said creating a prediction block comprises creating a differential predicted block based on an intra prediction mode by performing intra prediction on a result of subtracting neighboring blocks of a lower layer from neighboring blocks of the upper layer, and
said predicting the current block comprises encoding a residual block that is created as a result of the subtracting the created prediction block from the current block of the upper layer.

14. The method as set forth in claim 13, wherein said creating a prediction block comprises adding the differential predicted block and an intra block of the lower layer.

15. The method as set forth in claim 13, wherein the intra prediction mode is selected from among nine modes including eight directional modes and one DC mode.

16. The method as set forth in claim 15, wherein the intra prediction mode is selected by adding nine differential prediction blocks based on the nine modes to the intra block, and selecting one, which has a minimum image difference with respect to the current block of the upper layer corresponding to the intra block, from among nine predicted block candidates that are acquired by the adding the differential predicted block and the reconstructed intra block.

17. The method as set forth in claim 15, wherein the selection of the mode is performed by adding nine differential prediction blocks based on the nine modes to the intra block, applying an R-D cost function to nine encoded differential predicted block candidates that are acquired by encoding nine predicted block candidates acquired as a result of the adding the nine differential prediction blocks to the nine encoded differential predicted block candidates, and selecting one, which minimizes the R-D cost function, from among the nine differential predicted block candidates.

18. The method as set forth in claim 15, wherein the selected intra prediction mode is identical to an optimal intra prediction mode that is used for reconstructing the intra block of the lower layer.

19. The method as set forth in claim 16, further comprising acquiring a directional difference between the selected mode and the optimal intra prediction mode that is used for reconstructing the intra block of the lower layer.

20. The method as set forth in claim 17, further comprising acquiring a directional difference between the selected mode and the optimal intra prediction mode that is used for reconstructing the intra block of the lower layer.

21. A method of efficiently predicting a multi-layer based video frame, the method comprising:
acquiring a current block that belongs to an upper layer;
creating a prediction block with respect to the current block; and
predicting the current block based on the created prediction block,
wherein said creating a prediction block comprises creating a differential predicted block based on an intra prediction mode by performing intra prediction on a result of subtracting neighboring blocks of a lower layer from neighboring blocks of the upper layer, and
said predicting the current block comprises reconstructing the current block of the upper layer corresponding to the intra block of the lower layer, and adding the reconstructed current block of the upper layer and the created prediction block.

22. The method as set forth in claim 21, wherein said creating a prediction block comprises adding the differential predicted block and an intra block of the lower layer.

23. The method as set forth in claim 21, wherein the intra prediction mode is one of nine modes, including eight directional modes and one DC mode, which is transferred from a video encoder.

24. The method as set forth in claim 22, wherein the transferred mode is identical to an optimal intra prediction mode that is used for reconstructing the intra block of the lower layer.

25. The method as set forth in claim 21, wherein the intra block and the neighboring blocks of the lower layer each have a 4×4 size.

26. The method as set forth in claim 24, wherein the neighboring blocks of the lower layer comprise a left block, an upper left block, an upper block and an upper right block of the intra block, and the neighboring blocks of the upper layer comprise a left block, an upper left block, an upper block and an upper right block of the current block of the upper layer that corresponds to the intra block.

27. A multi-layer based video encoder comprising:
- means for acquiring a current block that belongs to an upper layer;
- means for creating a prediction block with respect to the current block; and
- means for predicting the current block based on the created prediction block,
- wherein the means for creating a prediction block comprises a means for creating a differential predicted block based on an intra prediction mode by performing intra prediction on a result of subtracting neighboring blocks of a lower layer from neighboring blocks of the upper layer, and a means for adding the differential predicted block and an intra block of the lower layer, and
- the means for predicting the current block comprises a means for encoding a residual block that is created as a result of the subtracting the created prediction block from the current block of the upper layer.

28. A multi-layer based video encoder comprising:
- means for acquiring a current block that belongs to an upper layer;
- means for creating a prediction block with respect to the current block; and
- means for predicting the current block based on the created prediction block,
- wherein the means for creating a prediction block comprises a means for creating a differential predicted block based on an intra prediction mode by performing intra prediction on a result of subtracting neighboring blocks of a lower layer from neighboring blocks of the upper layer, and a means for adding the differential predicted block and an intra block of the lower layer, and
- the means for predicting the current block comprises a means for reconstructing the current block of the upper layer corresponding to the intra block of the lower layer, and adding the reconstructed current block of the upper layer and the created prediction block.

29. A non-transitory storage medium storing a computer-readable program for executing the method described in any one of claim 1.

30. A non-transitory storage medium storing a computer-readable program for executing the method described in any one of claim 13.

31. A non-transitory storage medium storing a computer-readable program for executing the method described in any one of claim 21.

* * * * *